Patented May 23, 1944

2,349,438

UNITED STATES PATENT OFFICE 2,349,438

PROCESS OF PRODUCING A GAS SUITABLE FOR THE SYNTHESIS OF HYDROCARBONS

Heinrich Koppers, Essen, Germany, assignor, by mesne assignments, to Koppers Company, Pittsburgh, Pa., a corporation of Delaware No Drawing. Application November 25, 1939, Serial No. 306,077. In Germany December 3, 1938

1 Claim. (Cl. 252—373)

This invention relates to the production of a gas suitable for the synthesis of hydrocarbons, such as for synthesis of motor fuels and lubricating means, said gas containing carbon monoxide and hydrogen preferably in a ratio of about 1:1 up to 1:2 by employing hydrocarbon gases, for instance coke oven gas, natural gas, residual gas of the synthesis of hydrocarbons, and producer gas, or the like.

It is known to convert coke oven gas, which has rather a high content of methane, by cracking with steam at elevated temperatures (about 1200 degrees centigrade). Thereby a reaction gas rich in hydrogen and poor in carbon dioxide is produced in which, however, the proportion of carbon monoxide to hydrogen is about 1:4 up to 1:6. Such a gas is unsuitable for the synthesis of hydrocarbons and therefore it is necessary to mix this gas with gases rich in carbon monoxide so as to obtain the desired proportion of carbon monoxide to hydrogen.

Producer gas in the necessary ratio of carbon monoxide to hydrogen is mainly used as an addition to the cracked coke oven gas.

Producer gas of the normal composition still contains, however, a considerable quantity of carbon dioxide even though the producer gas-making process is carried out with a comparatively high addition of steam and at gasifying temperatures lying below the ash melting point, as is often necessary for up-to-date generator plants, and in particular for continuously operated gas producers, in which a gas practically free of nitrogen or poor in nitrogen is produced by gasifying the solid fuel with oxygen and steam. In order to produce a suitable synthesis gas from such a producer gas by the addition of cracked coke oven gas, it is necessary to remove the carbon dioxide from the producer gas, for example by a special gas washing process. These well known gas washing processes have, however, the essential disadvantage that besides the carbon dioxide also a fairly considerable quantity of valuable hydrogen is extracted from the gas. With the removal of carbon dioxide in this way, one loses for instance about 6 to 8% of hydrogen by washing the gas with water at increased pressure.

This invention now has for its object to remove the carbon dioxide contained in the producer gas down to the percentage permissible for the synthesis gas by heating the producer gas rich in carbon dioxide, and made from a solid fuel such as coke, black coal, brown coal or the like, together with coke oven gas, natural gas, residual gas aforesaid or the like, in the presence of steam to temperatures above say 1100 to 1200 degrees centigrade.

On account of this heating, the carbon dioxide contained in the producer gas is converted with the hydrocarbons of the coke oven gas, or of another gas, in particular with the methane contained in the coke oven gas, into carbon monoxide and hydrogen.

It is already known that it is possible to convert methane with carbon dioxide at increased temperatures into hydrogen and carbon monoxide. Up to now, this reaction has, however, not yet been utilized in practical operation, since the production of carbon dioxide is in itself rather expensive so that the cracking of coke oven gas was carried out hitherto with much cheaper steam.

But with the process according to this invention, the carbon dioxide is obtained as a ballast in the producer gas. This ballast being utilized for the conversion of methane, saves on the one hand, part of the steam addition otherwise necessary for the cracking of methane and, on the other hand, saves the cost for the removal of carbon dioxide from producer gas.

Another important advantage offered by this invention consists in that the addition of producer gas, which is necessary in order to achieve the desired compounds of the final gas, may be reduced considerably as compared with the addition of producer gas to the already cracked gas containing hydrocarbons, since the carbon dioxide contained in the producer gas converts with methane into the desired compounds of carbon monoxide and hydrogen in a proportion corresponding to that of standard producer gas.

Furthermore, the process according to the present invention offers the special advantage that the hydrocarbons still contained in the producer gas also may be converted into carbon monoxide and hydrogen by heating them to increased temperatures. The higher molecular carbon and sulphur compounds contained in the producer gas, which compounds are very disadvantageous for the synthesis of hydrocarbons when passed over nickel or cobalt catalysts, and which can only be removed with great difficulty in the prior known gas cleaning processes, are converted into low sulphur compounds, especially into $H_2S$ and hydrogen sulphide the removal of which can be effected much more easily from the synthesis gas.

The following example shows the method of carrying out the process according to this invention.

It is understood that standard pit coke serves as the solid fuel for the production of producer gas. By gasification with oxygen with a correspondingly increased addition of steam, there is produced in a standard revolving grate-producer, a gas having the following composition:

| | Per cent |
|---|---|
| $CO_2$ | 22.7 |
| $O_2$ | 0.3 |
| $CO$ | 34.9 |
| $H_2$ | 40.8 |
| $N_2$ | 1.3 |

It is assumed that 10,450 cu. m. of the above composition of producer gas are manufactured per hour.

This quantity of producer gas is mixed with 10,000 cu. m. of coke oven gas of the following composition:

| | Per cent |
|---|---|
| $CO_2$ | 2.5 |
| $C_nH_m$ | 2.5 |
| $H_2$ | 57.0 |
| $CH_4$ | 26.0 |
| $CO$ | 7.0 |
| $N_2$ | 5.0 |

After the addition of steam into a regenerative gas heater, which has preferably the shape of a tower-like regenerator, the gas mixture is heated therein to a temperature of about 1200 degrees centigrade, thus producing 27,700 cu. m. of reaction gas. This reaction gas has the following composition:

| | Per cent |
|---|---|
| $CO_2$ | 5.01 |
| $H_2$ | 61.00 |
| $CO$ | 30.50 |
| $CH_4$ | 0.72 |
| $N_2$ | 2.77 |

The addition of steam is calculated in such a way that when converting the gas mixture in the regenerator, no elementary carbon is produced, and the desired equilibrium of water gas is assured.

I have now above described my present invention on the lines of a preferred embodiment thereof, but my invention is not limited in all of its aspects to the mode of carrying it out as described and shown, since the invention may be variously embodied within the scope of the following claim.

I claim:

Process of producing a gas suitable for the synthesis of hydrocarbons and containing therefor CO and $H_2$ in ratio of from 1:1 up to 1:2, comprising: mixing producer gas that is rich in carbon dioxide and that has been produced by simultaneous passage of oxygen and steam through, for concurrent thermal reaction with, incandescent solid carbonaceous fuel, with at least one of the hydrocarbon gases of the group consisting of coke oven gas, natural gas, and residual gas from the synthesis of hydrocarbons, and with steam; and heating the mixture to a temperature between 1100 and 1200 degrees centigrade so as to thereby react the hydrocarbon gas of the mixture with the steam and with the $CO_2$ of the producer gas, the producer gas being mixed in proportion to the hydrocarbon gas so that the amount of CO in the producer gas together with the CO formed by cracking of the hydrocarbons of the hydrocarbon gas by reaction with the $CO_2$ of the producer gas and steam is such as to produce in the final reaction gas CO and $H_2$ in ratio of 1:1 to 1:2.

HEINRICH KOPPERS.